United States Patent
Saito et al.

(10) Patent No.: US 7,367,421 B2
(45) Date of Patent: May 6, 2008

(54) RACK AND PINION TYPE POWER STEERING APPARATUS

(75) Inventors: Tatsuya Saito, Tochigi (JP); Yukio Tajima, Tochigi (JP); Yoshio Onoguchi, Tochigi (JP)

(73) Assignee: Showa Corporation, Saitama (JP)

( * ) Notice: Subject to any disclaimer, the term of this patent is extended or adjusted under 35 U.S.C. 154(b) by 347 days.

(21) Appl. No.: 11/082,310

(22) Filed: Mar. 17, 2005

(65) Prior Publication Data

US 2006/0076180 A1    Apr. 13, 2006

(30) Foreign Application Priority Data

Sep. 27, 2004    (JP)    ............... 2004-279846

(51) Int. Cl.
  *B62D 5/06*    (2006.01)
(52) U.S. Cl. ....................... 180/426; 267/136
(58) Field of Classification Search ............... 180/428; 267/136
See application file for complete search history.

(56) References Cited

U.S. PATENT DOCUMENTS 4,127,186 A * 11/1978 Koyano et al. ............ 180/428
4,213,660 A *  7/1980 Yasui et al. ............... 384/585
4,721,175 A *  1/1988 Butler ....................... 180/428
5,216,928 A *  6/1993 Kodachi ...................... 74/422
6,485,180 B2 * 11/2002 Mena .......................... 384/222
6,644,430 B2 * 11/2003 Harer et al. ................ 180/428

OTHER PUBLICATIONS

Japanese Patent Application Laid-Open No. 2000-177606.

\* cited by examiner

*Primary Examiner*—Lesley D. Morris
*Assistant Examiner*—Michael Stabley
(74) *Attorney, Agent, or Firm*—Orum & Roth LLC

(57) ABSTRACT

A rack shaft is supported at three positions including a gear housing receiving an engagement portion between a rack gear and a pinion near one end in an axial direction with respect to a rack housing corresponding to a support body thereof, a housing near the other end, and a hollow tube housing in an approximately center portion of the rack shaft. A bush made of a resin and constituted by a cylinder body is used for supporting the rack shaft by the hollow tube housing in the approximately center portion of the rack shaft. The bush is provided with a plurality of cut grooves extending in an axial direction thereof, and is provided with a curve forming portion substantially supporting the rack shaft and extending toward an inner side in a center portion in the axial direction thereof.

10 Claims, 6 Drawing Sheets

RACK AND PINION TYPE POWER STEERING APPARATUS

BACKGROUND OF THE INVENTION

1. Field of the Invention

The present invention relates to a rack and pinion type power steering apparatus characterized by a rack bush sidably supporting a rack shaft and an attaching structure of the bush.

2. Description of the Related Art

In a rack and pinion type steering apparatus, a structure is well known in which a rack shaft is slidably supported to a rack housing corresponding to a support body of the rack shaft at two positions. These structures comprise a gear housing position corresponding to a position close to one end of the rack shaft corresponding to an engagement portion between a rack gear of the rack shaft and a pinion, and the other housing position corresponding to a position close to the other end. The rack shaft is supported to the rack housing at these positions via a rack bush made of synthetic resin, rubber or the like (refer, for example, to Japanese Unexamined Patent Publication No. 2000-177606 (patent document 1) (page 4, FIG. 1)).

The slidable support of the rack shaft 01 to the rack housing 02 described in the patent document 1 mentioned above is accomplished at two positions comprising one end portion 05 corresponding to a position at which a rack gear 03 in both ends portions of the rack shaft 01 and a pinion 04 are engaged with each other, and the other end portion 06 of the rack shaft 01, as illustrated in FIG. 6. Each of first and second rack bushes 07 and 08 used in the support of the one end portion 05 and the other end portion 06 of the rack shaft 01 is made of a synthetic resin or the like. These rack bushes 07 and 08 are provided with three support portions which support the rack shaft 01 in a contact manner, slightly protruding from the inner peripheral surfaces thereof and are not clearly illustrated, in the inner peripheral surface. These three support portions in the first bush 07 and the second bush 08 are arranged in the inner peripheral surfaces of the respective bushes 07 and 08 in such a manner that a phase in a peripheral direction of the peripheral surface of the rack shaft 01 is shifted with each other.

In this case, the support of the rack shaft 01 by the rack bushes 07 and 08 in two positions comprising the one end portion 05 and the other end portion 06 of the rack shaft 01 mentioned above is executed by using the bushes 07 and 08 provided with a specific support structure. The support position of the rack shaft 01 includes the engagement portion between the rack gear 03 and the pinion 04 corresponding to the support portion of the one end portion 05 of the rack shaft 01, and the other end portion 06 which is relatively distant from the engagement portion. The support of the rack shaft 01 at two relatively distant positions in both ends of the rack shaft 01 generates an oscillation of the rack shaft 01 in spite of the use of the bushes 07 and 08 provided with the specific support structure mentioned above. The generation of the oscillation in the rack shaft 01 makes it difficult to secure a proper engagement between the rack gear 03 and the pinion 04, and it is very difficult to inhibit a gear engaging sound from being generated due to the engagement of the gears.

Under these circumstances, it is desirable to improve the rack and pinion type power steering apparatus mentioned above. The improvement involves a selective setting of a proper support position to the housing by the rack bush of the rack shaft and the support structure of the rack bush and the rack shaft by the bush, in the slidable support to the housing by the rack bush of the rack shaft. It is thereby possible to effectively inhibit an oscillation of the rack shaft from being generated, to intend to make the engagement between the rack gear of the rack shaft and the pinion proper, and to effectively inhibit the gear engaging sound generated when the gears are engaged.

SUMMARY OF THE INVENTION

An object of the present invention is to make the engagement between a rack gear and a pinion in a manner which inhibits a gear engaging sound from being generated, by supporting a rack shaft with respect to a support body at three positions so as to inhibit the rack shaft from being oscillated.

The present invention relates to an improved structure of a rack and pinion type power steering apparatus for solving the problem mentioned above. The invention particularly relates to a provision of an improved structure of the power steering apparatus in view of a selective setting of a proper support position to a housing by a rack bush of a rack shaft and a support structure of a rack bush and the rack shaft by the bush, in the slidable support to the housing by the rack bush of the rack shaft. The present invention provides a rack and pinion type power steering apparatus in which a rack shaft is supported at three positions comprising both end side positions in an axial direction of the shaft with respect to the support body and an intermediate position. The supports of the rack shaft form a support making the rack shaft by a rack bush made of a synthetic resin or the like sidable in the axial direction.

The present invention provides a structure of a rack bush structured such that the rack bush slidably supporting the rack shaft in the rack and pinion type power steering apparatus with respect to the support body in the axial direction of the shaft is formed as an approximately cylindrical body made of a synthetic resin or the like. The rack bush is cut to a predetermined portion along an axial direction of the cylinder body alternately from both end portions in the axial direction of the cylinder body and is provided with a plurality of grooves at a uniform interval in a circumferential direction of the cylinder body. A center portion in the axial direction in an inner peripheral portion of the cylinder body is formed as a bulge portion curved toward the axial direction.

The present invention provides a structure of a rack bush structured such that the rack bush slidably supporting the rack shaft in the rack and pinion type power steering apparatus with respect to the support body in the axial direction of the shaft is formed as an approximately cylindrical body made of a synthetic resin or the like. The rack bush is cut along an axial direction of the cylinder body, except both end portions in the axial direction of the cylinder body, and is provided with a plurality of grooves at a uniform interval in a circumferential direction of the cylinder body. A center portion in the axial direction of the structure body of the cylinder body extending in the axial direction between the grooves pinched by the grooves is formed as a bulge portion curved toward the axial direction.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 3A and 3B are views showing a rack bush of the present invention, in which FIG. 3A shows a side cross sectional view and is a cross sectional view along a line A-A in FIG. 3B, and FIG. 3B is a front elevational view;

FIGS. 5A and 5B are views showing a rack bush in FIG. 4 in accordance with the present invention, in which FIG. 5A shows a side cross section and is a cross sectional view along a line B-B in FIG. 5B, and FIG. 5B is a front elevational view.

DESCRIPTION OF THE PREFERRED EMBODIMENTS

A description will be given below of an embodiment in accordance with the present invention illustrated in FIGS. 1 to 5B.

Figure 1:
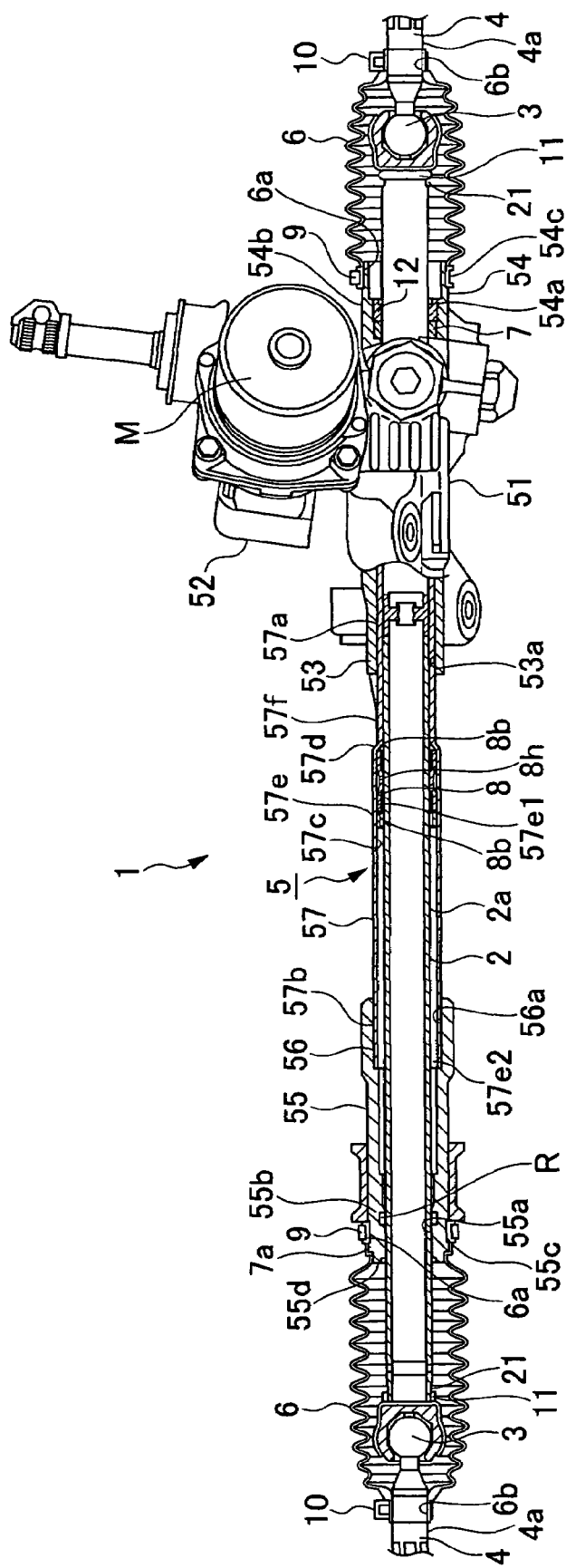
FIG. 1 is a view of an entire rack and pinion type power steering apparatus in accordance with the present invention, in which a part thereof is shown by a cross section.

In FIG. 1, there is illustrated an essentially overall view of a rack and pinion type power steering apparatus 1 in accordance with the present invention in a state in which a part thereof is shown by a cross section.

The power steering apparatus 1 is provided with a steering handle and a steering shaft which are not illustrated, an electric motor M for applying an assist steering force, and is provided with a rack shaft 2. Also provided are a pinion (not shown) inputting a handle steering force to the rack shaft 2, a rack gear (not shown) of the rack shaft 2 with which the pinion is engaged, and tie rods 4 and 4 connected via ball joints 3 and 3 in both ends of the rack shaft 2 and transmitting motion of the rack shaft 2 to a steered wheel (not shown). A rack housing 5 receiving and surrounding a periphery of the rack shaft 2, and a gear housing 51 receiving an engagement portion between the pinion and the rack gear and corresponding to a part of the rack housing 5 are also provided.

The electric motor M is integrally attached to an extension housing 52 of the gear housing 51. An assist steering force thereof is transmitted to a steering force output shaft provided with the pinion via a worm gear mechanism (not shown) within the housing 52. The rack shaft 2 can be moved forward and backward at a predetermined stroke in an axial direction within the housing 5 via the engagement between the pinion of the steering force output shaft and the rack gear. Although an illustration is omitted, the rack gear is formed as a gear portion having a predetermined length. The gear portion of the rack shaft 2 corresponds to a portion in which a part of a side surface of a circular cross sectional shape of the rack shaft 2 is notched around the predetermined length and the gear is formed.

The forward and backward movement in the axial direction of the rack shaft 2 at the predetermined stroke within the rack housing 5, that is, the forward and backward movement of the rack shaft 2 in a lateral direction illustrated in FIG. 1 is transmitted to the tie rods 4 and 4 connected via the ball joints 3 and 3 in both ends of the rack shaft 2. The motion of the tie rods 4 and 4 is further transmitted to the steered wheel (not shown) for steering, whereby a direction change of the vehicle is executed.

The rack housing 5 receiving and surrounding the rack shaft 2 includes the gear housing 51 in a right end side illustrated in FIG. 1 surrounding a portion near both end portions of the rack shaft 2, a left housing 55 in a left end side, and a hollow tube housing 57 corresponding to an intermediate housing connecting between a tubular housing 53 extending from a left side of the gear housing 51 and a tubular housing 56 extending from a right side of the left housing 55. The hollow tube housing 57 is structured such that a right end outer peripheral portion 57a is press fit and held to an inner peripheral portion 53a of the right tubular housing 53 of the gear housing 51, and a left end outer peripheral portion 57b is pressure inserted and held to a right side inner peripheral portion 56a of the tubular housing 56 in the left housing 55. The rack shaft 2 is entirely received and surrounded in this manner except for both end portions covered by bellows 6 and 6 in the rack shaft 2.

The rack shaft 2 is supported so as to freely move forward and backward at a predetermined stroke in an axial direction, that is, a lateral direction illustrated in FIG. 1 within the rack housing 5 corresponding to the support portion of the rack shaft 2 as already described above. The support of the rack shaft 2 in the rack housing 5 is executed at three positions, including a position of the gear housing 51 close to a right end of one rack shaft 2, a position of the left housing 55 close to a left end of the other rack shaft 2, and a position surrounded by the hollow tube housing 57 in the approximately center in the longitudinal direction of the rack shaft 2.

The one support of the rack housing 5 of the rack shaft 2, that is, the support of the rack shaft 2 at the position of the gear housing 51 close to the right end of the rack shaft 2 in FIG. 1 is achieved by being slidably supported to the tubular housing 54 extending from the right side of the gear housing 51. The housing 54 extends in a tubular shape at a predetermined length so as to coaxially surround the outer peripheral portion of the rack shaft 2 via a rack bush 7 mentioned below made of a synthetic resin or the like.

The other support of the rack housing 5 of the rack shaft 2, that is, the support of the rack shaft 2 at the position of the left housing 55 close to the left end of the rack shaft 2 in FIG. 1 is achieved by being supported via a slidable ring member R fitted into an annular recess portion 55b formed in an inner peripheral portion 55a close to the end portion of the left rack shaft 2 of the left housing 55.

The support the approximate center in the longitudinal direction by the rack housing 5 of the rack shaft 2, that is, the support of the rack shaft 2 surrounded by the hollow tube housing 57 in the approximately center in FIG. 1 is accomplished via the slidable bush 8 fitted and attached between the outer peripheral portion 2a of the rack shaft 2 and the inner peripheral portion 57c of the hollow tube housing 57.

In this case, the support at the approximate center of the rack shaft 2 will be described later in detail.

In this case, the position of the gear housing 51 and the position of the left housing 55 which correspond to one and the other support portions of the rack shaft 2 mentioned above are both portions structuring both ends of the rack shaft 2. Accordingly, the support portions of the rack shaft 2 are adjacent to the ball joint portions 3 and 3 corresponding to the connecting portions to the tie rods 4 and 4.

Therefore, the bellows 6 and 6 covering the ball joint portions 3 and 3 for protection are respectively attached to the support portions of the rack shaft 2 in both ends of the rack shaft 2. An annular recess portion 54c provided in an outer peripheral portion 54b in a right end side of the tubular housing 54 extending from the right side of the gear housing 51 is formed as a structure portion provided for attaching the bellows 6, in the one support portion of the rack shaft 2. An outer peripheral portion 55c in a left end side of the left housing 55 is formed as a structure portion provided for attaching the bellows 6, in the other support portion of the rack shaft 2.

The attachment of the bellows 6 at the position of the gear housing 51 is achieved by the annular recess portion 54c of the outer peripheral portion 54b of the tubular housing 54. One end opening portion 6a of the bellows 6 is fitted to the annular recess portion 54c so as to be fastened and caulked by a bellows band 9 from an outer side of the opening portion 6a of the bellows 6, and the other end opening portion 6b of the bellows 6 is fitted to an outer peripheral portion 4a of the tie rod 4 so as to be fastened by a tie rod clip 10. In this manner, the attachment of the bellows 6 is achieved.

The attachment of the bellows 6 at the position of the left housing 55 is achieved by the outer peripheral portion 55c of the housing 55. The one end opening portion 6a of the bellows 6 is fitted to the outer peripheral portion 55c of the housing 55 so as to be fastened and caulked by the bellows band 9. The other end opening portion 6b of the bellows 6 is fitted to the outer peripheral portion 4a of the tie rod 4 so as to be fastened by the tie rod clip 10. In this manner, the attachment of the bellows 6 is achieved.

The rack shaft 2 is provided with annular stopper rubbers 11 and 11 each having a predetermined width and made of synthetic resin, rubber or the like at positions adjacent to the ball joint portions 3 and 3 in both right and left ends of the rack shaft 2. The stopper rubbers 11 and 11 are press fit and fixed to slightly narrower portions 21 in both the right and left ends of the rack shaft 2.

One of the stopper rubbers 11 and 11 are brought into contact with an end of a stopper ring 12 fitted to the inner peripheral portion 54a of the rightward extending tubular housing 54 of the gear housing 51 in a moving end of a leftward movement in the stroke of the forward and backward movement of the rack shaft 2 in the lateral direction in FIG. 1. The other stopper rubber is brought into contact with a left end 55d of the left housing 55 in a moving end of a rightward movement. In this manner, the rack shaft 2 is inhibited from moving in the lateral direction, thereby determining the stroke in the forward and backward movement of the rack shaft 2 in the lateral direction with respect to the rack housing 5.

The power steering apparatus 1 is provided with the structure mentioned above, and the description is given of an outline of the support structure in the rack housing 5 of the rack shaft 2. In this case, a description will be given in more detail of the support portion of the rack shaft 2 in the approximately center in the longitudinal direction, that is, the support structure of the rack shaft 2 at the support position by the hollow tube housing 57 with reference to FIGS. 2 and 3.

The support of the rack shaft 2 in the approximately center portion in the longitudinal direction of the rack shaft 2 is accomplished by the hollow tube housing 57 structuring the center portion in the longitudinal direction of the rack housing 5. The support of the rack shaft 2 by the hollow tube housing 57 is accomplished by the cylindrical rack bush 8 mentioned below being fitted and attached between the inner peripheral portion 57c of the hollow tube housing 57 and the outer peripheral portion 2a of the rack shaft 2. An annular step portion 57d corresponding to a locking portion provided for inhibiting the rack bush 8 from moving in the axial direction is formed in the hollow tube housing 57 for this purpose. The hollow tube housing 57 includes a large-diameter tube housing 57e and a small-diameter tube housing 57f, whereby the annular step portion 57d is formed.

Figure 2:
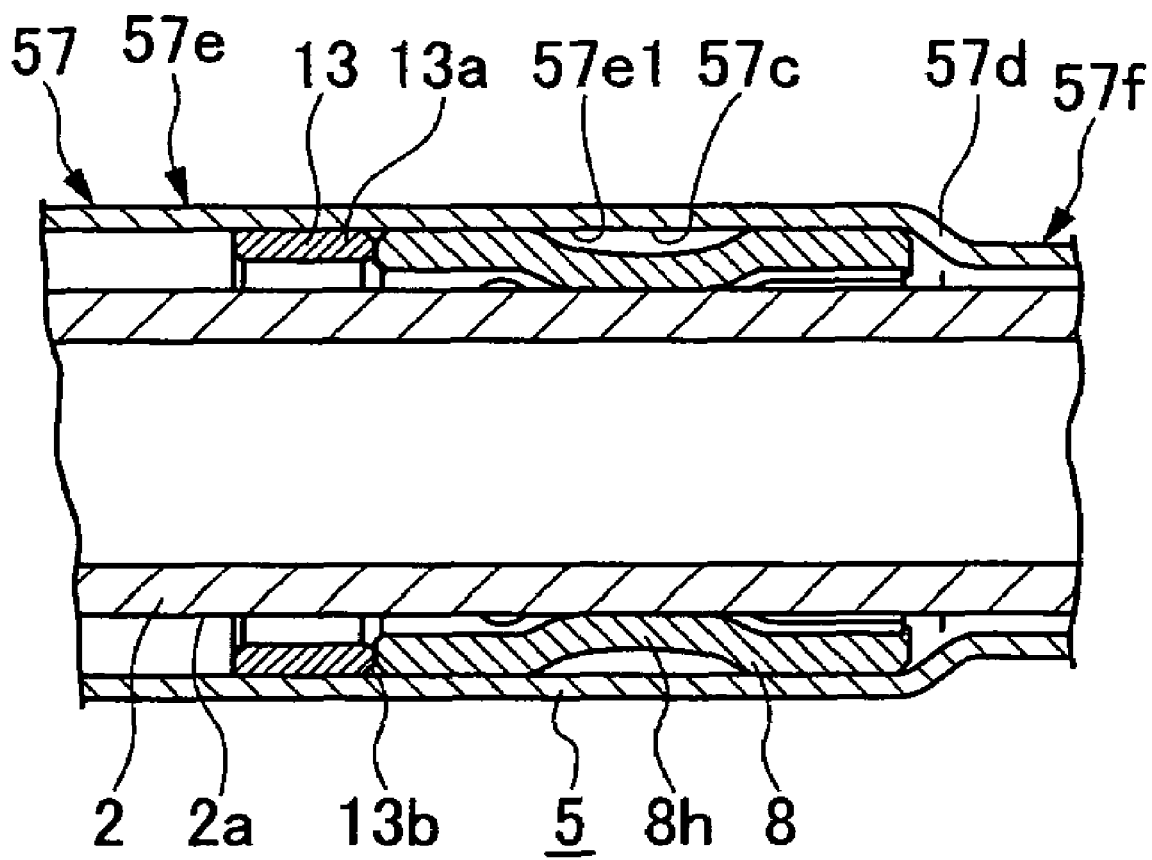
FIG. 2 is an enlarged cross sectional view showing a main structure portion of the present invention.

The hollow tube housing 57 is structured such that a right side in FIGS. 1 and 2 is formed as the small-diameter tube housing portion 57f. The small tube housing portion 57f extends to the inner peripheral portion 53a of the tubular housing 53 extending to a left side of the gear housing 51 from the annular step portion 57d corresponding to a left end of the tube housing portion 57f. Housing portion 57f coaxially surrounds the outer peripheral portion 2a of the rack shaft 2 corresponding to a hollow shaft having a circular cross section at a slight gap by this extension portion. A right end of the extension portion is press fit and fixed to the inner peripheral portion 53a of the tubular housing 53 extending to a left side of the gear housing 51.

A left side of the hollow tube housing 57 is formed as the large-diameter tube housing portion 57. The large tube housing portion 57e extends to the inner peripheral portion 56a of the tubular housing 56 extending from a right side of the left housing 55 from the annular step portion 57d corresponding to a right end of the tube housing portion 57e. Housing portion 57e coaxially surrounds the outer peripheral portion 2a of the rack shaft 2 corresponding to the hollow shaft having the circular cross section at a comparatively large gap by this extension portion. A left end of the extension portion is press fit and fixed to the inner peripheral portion 56a of the tubular housing 56.

With reference to FIGS. 1 and 2, the structure is made such that the rack bush 8 mentioned above is fitted and attached between an inner peripheral portion 57e1 at an adjacent position of the annular step portion 57d corresponding to a right end of the large-diameter tube housing portion 57e of the hollow tube housing 57 and the outer peripheral portion 2a of the rack shaft 2. Although the fitting and attaching of the rack bush 8 is described later, a right end in the drawing corresponding to one end in the axial direction is brought into contact with the annular step portion 57d. The bush 8 can not move relative to the tube housing portion 57e. This results from being held in a contact manner from a left side in the drawing corresponding to the other end in the axial direction of the rack bush 8 by a stopper ring 13 pressure inserted and fitted to the inner peripheral portion 57e1 of the tube housing portion 57e, and from the application of a predetermined slidable pressure contact force to the rack shaft 2 so as to be fixed to the inner peripheral portion 57e1 of the tube housing portion 57e.

Figure 3A:
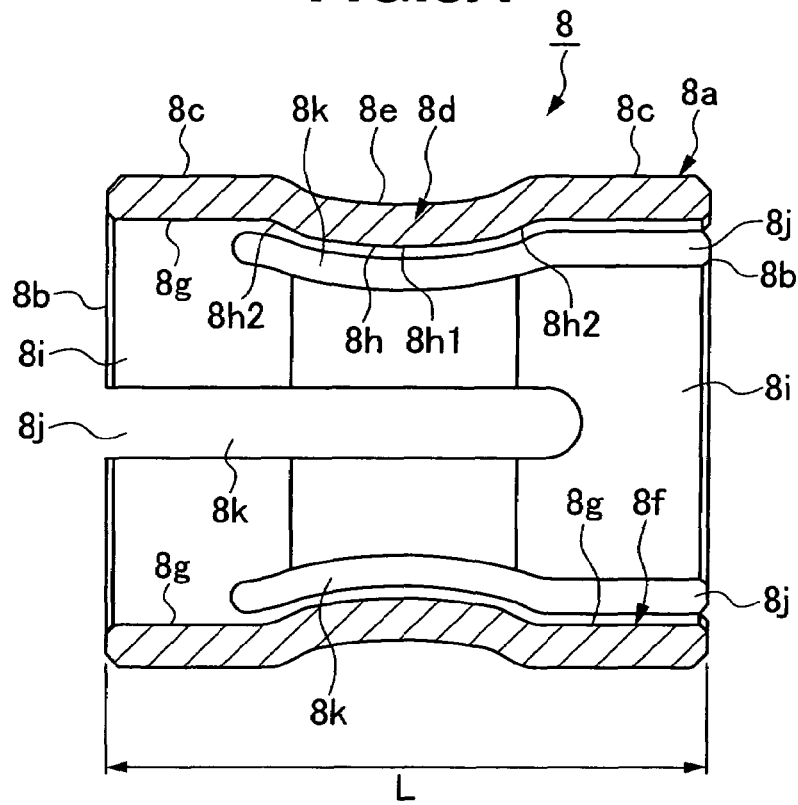
Figure 3B:
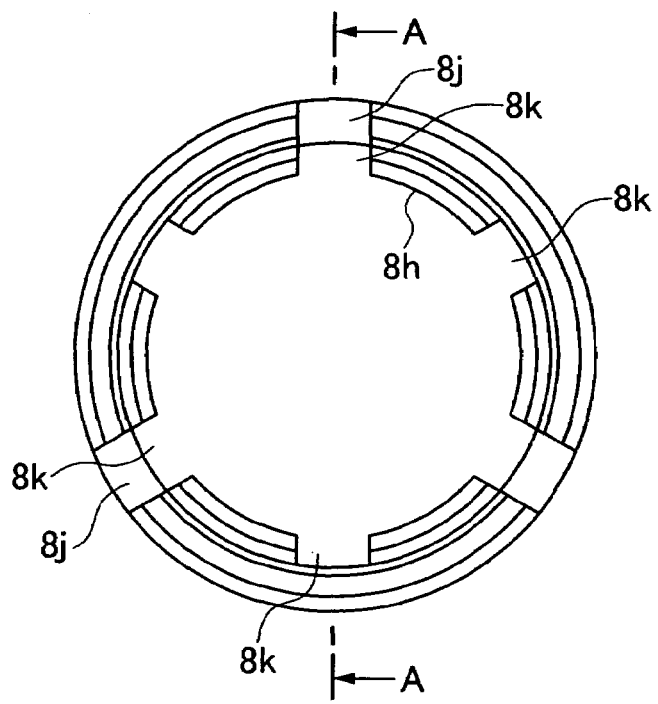

The rack bush 8 includes a member having a predetermined elasticity such as synthetic resin, rubber or the like, and is formed as a cylinder body having an approximately uniform thickness and a predetermined outer diameter as illustrated in FIGS. 3A and 3B. An outer peripheral portion 8a is formed as a linear cylindrical surface portion 8c close to both ends 8b in the axial direction of the cylinder body. A center portion 8d of the cylinder body pinched by the linear cylindrical surface portion 8c close to both ends 8b is curved and formed as an annular recessed curve forming portion 8e. Since the linear cylindrical surface portion 8c close to both ends 8b in the axial direction of the cylinder body of the outer peripheral portion 8a is a structure portion provided for a fitting surface for fitting and attaching the bush 8 to the hollow tube housing 57 of the rack housing 5, the linear cylindrical surface portion 8c is formed so as to be equal to or approximately equal to a diameter of the inner peripheral portion 57e1 of the tube housing portion 57e in the hollow tube housing 57.

An inner peripheral portion 8f of the rack bush 8 is formed as a linear cylindrical surface portion 8g having a predetermined length close to both ends 8b in the axial direction of the cylinder body. The center portion 8d of the cylinder body pinched between these linear cylindrical surface portions 8g is formed as a curve forming portion 8h curved toward an inner side. A bulge portion is curved to an inner side toward the axial direction of the cylinder body. The curve forming portion 8h is a structure portion supplied for supporting the rack shaft 2 mentioned below. A contracted portion 8h1 in which an inner diameter is most bulged by the curve forming portion 8h is set approximately equal to the outer diameter of the rack shaft 2.

The linear cylindrical surface portion 8g close to both ends 8b in the axial direction of the cylinder body in the cylinder body inner peripheral portion 8f has a positional relationship in correspondence to the linear cylindrical surface portion 8c close to both ends 8b in the axial direction of the cylinder body of the cylinder body outer peripheral portion 8a, and the curve forming portion 8h in the inner peripheral portion 8f has a positional relationship in correspondence to the curved and annular recessed curve forming portion 8e in the outer peripheral portion 8a. The structure thereby has the approximately uniform thickness in the cylinder body of the rack bush 8 as mentioned above.

The linear cylindrical surface portion 8g close to both ends 8b in the axial direction of the cylinder body in the cylinder body inner peripheral portion 8f is a linear cylindrical surface portion 8g extending at a predetermined length in an axial direction from each of opening portions 8i and 8i in both ends 8b of the cylinder body. The lengths of the linear cylindrical surface portions 8g are approximately equal to each other. The curve forming portion 8h pinched between the linear cylindrical surface portions 8g has a curve line in which both ends 8h2 are connected while drawing a continuous curve in the linear cylindrical surface portion 8g. A portion bulging to an innermost side (the axial direction) of the curve line, that is, the contracted portion 8h1, is positioned as a center position in the axial direction of the cylinder body. The length in the axial direction of the curve forming portion 8h runs up to a length approximately half of an axial length L (an entire length) of the cylinder body.

A plurality of cut grooves 8k, 8k, . . . having a predetermined width and having a cut opening 8j in opening portions 8i and 8i in both ends 8b in the axial direction of the cylinder body are provided from the opening portions 8i and 8i. The cut grooves 8k, 8k, . . . are notched alternately and at a uniform interval in a peripheral direction of the cylinder body from each of the opening portions 8i and 8i in both ends of the cylinder body, three by three are arranged at an interval of 120 degrees from each of the opening portions 8i and 8i in both ends 8b in the axial direction of the cylinder body, in the present embodiment, whereby a total of six cut grooves 8k, 8k, . . . having the uniform interval are notched alternately at an interval of 60 degree.

The cut grooves 8k, 8k, . . . are structured such that widths are equal to each other, lengths of extension in the axial direction are equal to each other, and the lengths runs up to approximately three fourth of the axial length L (the entire length). As a result, the respective grooves 8k, 8k, . . . are provided with a sufficient length including a length of the linear cylindrical surface portions 8c and 8g in the inner and outer peripheral portions 8a and 8f of the cylinder body close to both ends 8b in the axial direction of the cylinder body and the curve forming portions 8e and 8h in the inner and outer peripheral portions.

The stopper ring 13 is used as described for fixing the internal housing of the rack bush 8, that is, the hollow tube housing 57 to the inner peripheral portion 57c. The stopper ring 13 is made of a material such as a steel material or the like, corresponds to a ring member having a predetermined thickness and a predetermined width, and is press fit to the inner peripheral portion 57c of the hollow tube housing 57, more accurately, to the inner peripheral portion 57e1 of the large tube housing portion 57e of the hollow tube housing 57 for fixing the bush 8 mentioned above. The stopper ring 13 is provided with a ring outer peripheral portion 13a having an approximately equal diameter to that of the inner peripheral portion 57e1. The stopper ring 13 is finished carefully, and a comparatively large chamfering process 13b is applied to both edge portions in inner and outer peripheries of the ring 13.

Assembly of the rack bush 8 for supporting the rack shaft 2 to the hollow tube housing 57 is accomplished by fitting and attaching the rack bush 8 to the hollow tube housing 57 prior to inserting the rack shaft 2 to the hollow tube housing 57. The bush 8 is first press fit into the housing portion 57e from a left opening 57e2 in the drawing (refer to FIG. 1) of the large tube housing portion 57e of the hollow tube housing 57. The bush 8 is press fit until a right end 8b in the drawing of the bush 8 is brought into contact with the annular step portion 57d in the boundary of the small tube housing portion 57f and the large tube housing portion 57e.

The stopper ring 13 is press fit from the left opening 57e2 (refer to FIG. 1) of the large tube housing portion 57e. The ring 13 is press fit until the right end in the drawing is brought into contact with the left end 8b of the rack bush 8. The rack bush 8 is pinched between the annular step portion 57d in the boundary of the small tube housing portion 57f and the large tube housing portion 57e and the stopper ring 13 so as to inhibit the movement in the axial direction, and to be fitted and attached into the hollow tube housing 57. The rack shaft 2 is thereafter inserted into the hollow tube housing 57 to which the rack bush 8 is fitted and attached, through the opening 57e2.

In this case, the assembly is shown as an example, and other assembling methods can be appropriately employed.

Since the present embodiment is structured as mentioned above, the following operations and effects can be achieved.

The rack bush 8 includes an elastic body made of synthetic resin, rubber or the like and has a plurality of cut grooves 8k, 8k, . . . provided with the cut openings 8j in both ends 8b in the axial direction. Both the ends 8b are deformed in a comparatively easy manner so as to be easily press fit into the inner peripheral portion 57c of the hollow tube housing 57. The rack bush 8 is structured such that the curve forming portion 8h curves toward the center direction of the cylinder body of the center portion 8d in the axial direction. The bulge portion curved to the inner side of the cylinder body is in slidable contact with and is fitted to the outer peripheral portion 2a of the rack shaft 2. The rack shaft is smoothly inserted on the basis of the shape effect of the curve forming portion 8h.

To fit and attach between the inner peripheral portion 57c of the rack housing 57 of the rack bush 8, more particularly, the inner peripheral portion 57e1 of the large tube housing portion 57e and the outer peripheral portion 2a of the rack shaft 2 is facilitated as a result of the present invention.

The rack shaft is stably supported by the support portions at three positions. The oscillation of the rack shaft is inhibited so as to make the engagement between the rack gear and the pinion proper. It is thereby possible to effectively inhibit sound caused by the engagement between the rack gear and the pinion from being generated. It is also possible to effectively cancel a biased abrasion of the gear on the basis of the proper engagement between the rack gear and the pinion. Durability of the gear is improved, so that it is possible to improve durability of the rack shaft.

The support of the intermediate portion of the rack shaft 2 is set to the sidable support by the bulge portion curved to the inner side of the cylinder body in the center portion 8*d* in the axial direction of the rack bush 8. The rack shaft 2 is slidably supported with an elastic effect and friction force in the moving motion along the axial direction. It is possible to obtain an excellent vibration damping characteristic on the basis of the application of the small friction force, and it is possible to improve and reduce a resonance sound caused by the engagement between the rack gear and the pinion.

Figure 4:
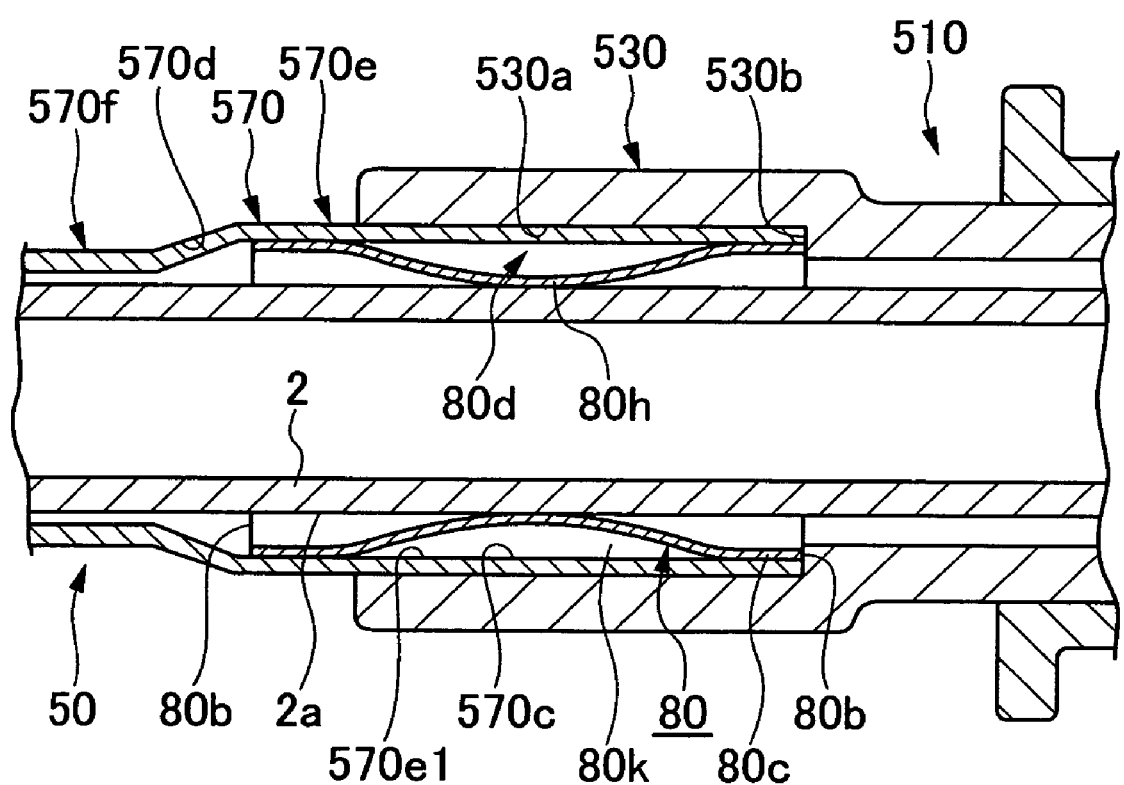
FIG. 4 is a view showing a main structure portion in accordance with the other aspect of the present invention.

Another aspect using a rack bush 80 illustrated in FIGS. 4 and 5 can be considered in addition to the rack bush 8 in the embodiment mentioned above in accordance with the present invention.

Alphabetic characters associated with reference numerals in a description of the embodiment in accordance with the other aspect are noted taking into consideration a corresponding relation to the structure portions in the embodiment mentioned above. The same alphabetic characters are noted as suffixes to the reference numerals of the corresponding structure portions which are assumed to be essentially identical.

Figure 5A:
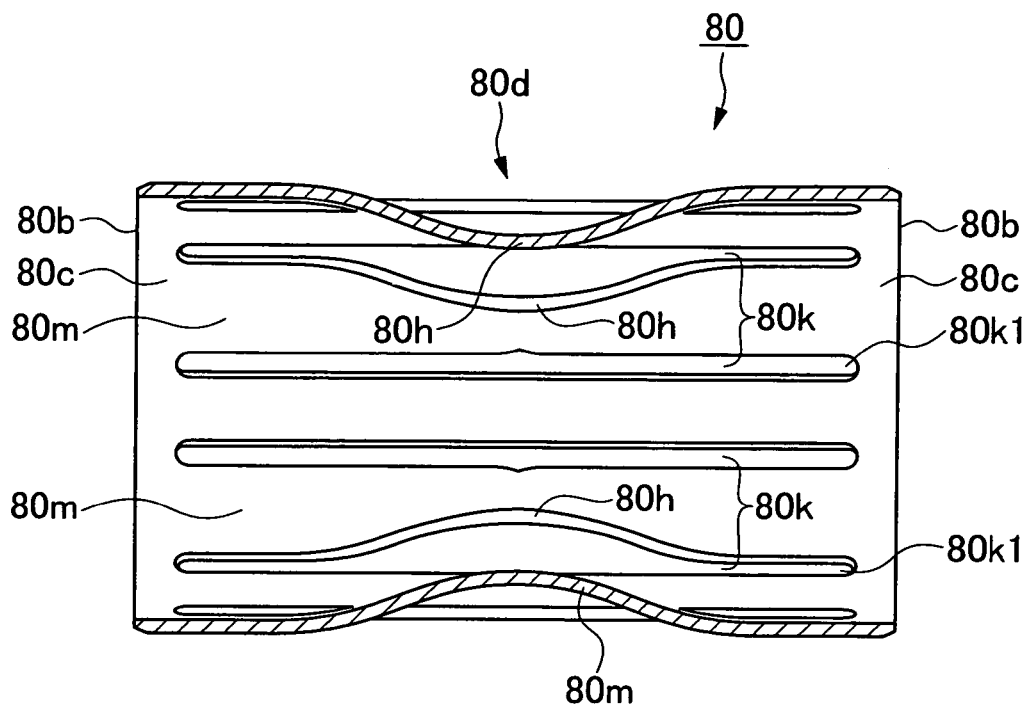
Figure 5B:
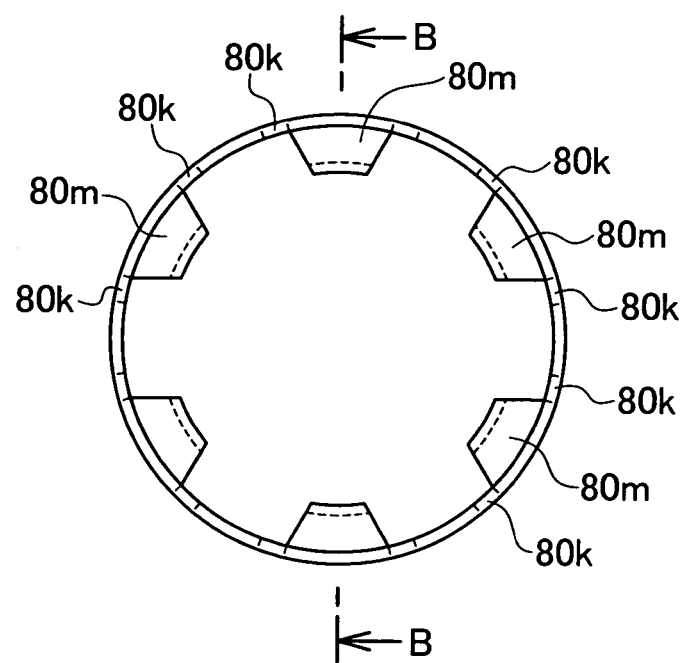
Figure 6:
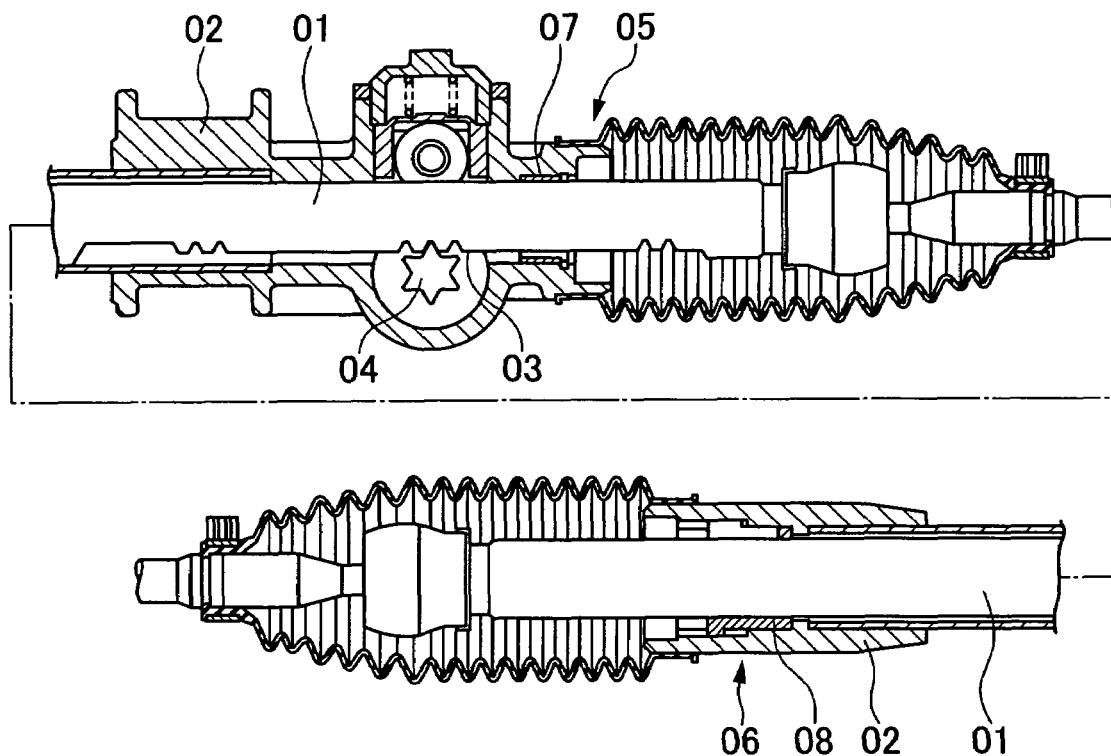
FIG. 6 is a cross sectional view showing a main structure portion in a conventional steering apparatus.

The rack bush 80 used in the embodiment in accordance with the other aspect is made of synthetic resin, rubber or the like. It is formed in an approximately cylindrical shape having a predetermined length as illustrated in FIGS. 5A and 5B, with a thickness thereof being comparatively small. In one embodiment, plurality of comparatively narrow grooves 80*k*, 80*k*, . . . which may be an even number such as twelve, are cut at a uniform interval in the cylinder body, except both ends 80*b* in an axial direction of the cylinder body and a linear cylinder portion 80*c* at a position close thereto in a circumferential direction. The grooves 80*k*, 80*k*, . . . extend in an axial direction, and an axial end portion 80*k*1 there of is not separated.

One set of the grooves 80*k* and 80*k* adjacent to each other form a pair, tube thickness portions 80*m*, 80*m*, . . . corresponding to a cylinder body structure portion formed in a band between the grooves pinched between the pair of grooves 80*k* and 80*k* extending along the axial direction of the cylinder body, six tube thickness portions 80*m*, 80*m*, . . . are formed at a uniform interval in a circumferential direction of the cylinder body of the rack bush 80, and the tube thickness portions 80*m*, 80*m*, . . . are provided with a curve forming portion 80*h* curved toward an inner side of the cylinder body. A bulge portion may be curved toward the axial direction of the cylinder body, in a center portion 80*d* in the extension along the axial direction of the cylinder body.

The rack bush 80 is attached to an inner peripheral portion 570*c* of a hollow tube housing 570 corresponding to an intermediate housing in a center portion in an axial direction of a rack housing 50, on the basis of a different attaching structure from the rack bush 8. More particularly, as illustrated in FIG. 4, the bush 80 is attached in a structure portion in which a major part of a tube housing portion 570*e* having a large diameter of the hollow tube housing 570 is press fit into an inner peripheral portion 530*a* of a tubular housing 530 corresponding to an extension portion of a gear housing 510. Accordingly, the hollow tube housing 570 is formed as the large-diameter tube housing portion 570*e* in the gear housing 510 side. The rack bush 80 is fitted between an inner peripheral portion 570*e*1 of the large-diameter tube housing portion 570*e* and the outer peripheral portion 2*a* of the rack shaft 2.

The fitted rack bush 80 is structured such that an outer peripheral portion of a linear cylinder portion 80*c* having no cut groove 80*k* close to both ends 80*b* in the axial direction is in pressure contact with and fitted to the inner peripheral portion 570*e*1 of the large tube housing portion 570*e* of the hollow tube housing 570. The curve forming portion 80*h* to the inner side of the center portion 80*d* in the axial direction in the tube thickness portions 80*m*, 80*m*, . . . is formed in the band between the cut grooves 80*k* and 80*k*. The bulge portion curved toward the axial direction of the cylinder body is in slidable contact with and fitted to the outer peripheral portion 2*a* of the rack shaft 2.

The right end 80*b* of the rack bush 80 is brought into contact with an annular step portion 530*b* of the inner peripheral portion 530*a* in the tubular housing 530 corresponding to the extension portion of the gear housing 510. The left end 80*b* is positioned to an annular step portion 570*d* corresponding to a boundary portion between the large-diameter tube housing portion 570*e* and the small-diameter tube housing portion 570*f* in the hollow tube housing 570.

Accordingly, the rack bush 80 is essentially completely inhibited from moving in an axial direction in spite of the moving motion in the axial direction of the rack shaft 2.

In this embodiment, since both ends 80*b* in the axial direction of the rack bush 80 include a complete cylinder portion having no cut groove 80*k*, strength thereof is high. It is thereby possible to stably and firmly fit the bush 80 to the inner peripheral portion 570*e*1 of the large-diameter tube housing portion 570*e* in the hollow tube housing 570.

The center portion 80*d* in the axial direction of the bush 80 is provided with curve forming portions 80*h* and 80*h* of the band-shaped tube thickness portions 80*m*, 80*m*, . . . corresponding to a plurality of cylinder body structure bodies formed by a pair of cut grooves 80*k* and 80*k*, that is, the curved bulge portions. This portion keeps a proper elasticity and flexibility. The rack shaft 2 is supported to the curve forming portions 80*h*, 80*h*, . . . constituted by a plurality of band-shaped tube thickness portions 80*m*, 80*m*, . . . . It is possible to apply a suitable vibration damping effect and a friction force to the rack shaft 2, and it is possible to achieve an improvement of the resonance sound caused by the engagement between the rack gear and the pinion in the moving motion in the axial direction of the rack shaft 2 by applying a minimum friction force.

The rack bush 80 is structured such that the right end 80*b* in the axial direction in the drawing is brought into contact with the annular step portion 530*b* of the inner peripheral portion 530*a* of the tubular housing 530 corresponding to the extension portion of the gear housing 510. The left end 80*b* in the axial direction is positioned to the annular step portion 570*d* corresponding to the bush locking portion in the boundary portion between the large-diameter tube housing portion 570*e* and the small-diameter tube housing portion 570*f* in the hollow tube housing 570 of the rack housing 50. A specific part such as the stopper ring or the like for inhibiting the rack bush 80 from moving in the axial direction is not required. The attaching structure of the bush 80 is simplified, the assembly property thereof is improved, and it is possible to achieve a low cost.

As mentioned above, the rack shaft is supported at three positions comprising both end side positions and the intermediate position in the axial direction of the shaft with respect to the support body. The supports of the rack shaft are structured such that the rack shaft is slidable in the axial direction by the rack bush made of the synthetic resin or the like. The rack shaft is stably supported by the support portions at three positions. Oscillation of the rack shaft is inhibited and the engagement between the rack gear and the pinion is optimized. Accordingly, it is possible to effectively inhibit sound caused by engagement between the rack gear and the pinion from being generated.

The present invention provides a method of attaching the rack bush at the intermediate support position of the rack shaft by fitting the outer periphery of the rack bush corresponding to the approximately cylinder body to the inner peripheral portion of the intermediate housing surrounding the outer periphery of the rack shaft. The end portion in the axial direction of the rack bush is brought into contact with the locking portion of the intermediate housing. The outer peripheral portion of the rack bush is fitted and supported to the inner peripheral portion of the intermediate housing, and the end portion in the axial direction is brought into contact with the locking portion of the housing so as to be fixed. Accordingly, the rack shaft is firmly and stably supported to the housing without generating any displacement in spite of slidable movement of the rack shaft.

The rack bush slidably supporting the rack shaft in the rack and pinion type power steering apparatus with respect to the support body in the axial direction of the shaft is formed as an approximately cylindrical body made of synthetic resin or the like. The rack bush is cut to a predetermined portion along the axial direction of the cylinder body alternately from both end portions in the axial direction of the cylinder body and is provided with a plurality of grooves at the uniform interval in the peripheral direction of the cylinder body. The center portion in the axial direction in the inner peripheral portion of the cylinder body is formed as the bulge portion curved toward the axial direction. The contact portion between the rack bush made of synthetic resin and the rack shaft in the support of the rack shaft is formed as the curved bulge portion in the center portion in the axial direction of the bush. Accordingly, it is possible to obtain a stable vibration damping effect which is not affected by an amount of axial eccentricity of the rack shaft by securing the proper elastic effect and friction force on the basis of the elasticity of the bulge portion. It is also possible to achieve improvement of the resonance sound on the basis of the vibration damping effect by applying the minimum friction force.

The rack bush slidably supporting the rack shaft in the rack and pinion type power steering apparatus with respect to the support body in the axial direction of the shaft is formed as an approximately cylindrical body made of the synthetic resin or the like. The rack bush is cut along the axial direction of the cylinder body except both the end portions in the axial direction of the cylinder body and is provided with a plurality of grooves at the uniform interval in the peripheral direction of the cylinder body. The center portion in the axial direction of the cylinder body structure portion extending in the axial direction between the grooves pinched by these grooves is formed as the bulge portion curved toward the axial direction. The rack bush is structured such that a plurality of grooves are cut except both the end portions in the axial direction of the cylinder body. Accordingly, both end portions in the axial direction of the cylinder body have a high rigidity, and the attachment of the bush is stably and firmly executed in both the end portions having the high rigidity.

Further, since the contact portion between the rack bush made of the synthetic resin and the rack shaft in support of the intermediate portion of the rack shaft is formed as the bulge portion curved in the center portion in the axial direction of the bush. The rack shaft is exposed to the proper elastic friction force by the bulge portion. It is possible to stably obtain the vibration damping effect, and it is possible to achieve improvement of the resonance sound by applying the minimum friction force on the basis of the vibration damping effect.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be encompassed within a scope of equivalents thereof with respect to the features set out in the appended claims.

What is claimed is:

1. A rack and pinion type power steering apparatus wherein a rack shaft is a supported body supported at three positions comprising both end side positions in an axial direction of the shaft with respect to the supported body and an intermediate position, and the supports of the rack shaft form a support structure making the rack shaft by a rack bush made of a bushing material slidable in the axial direction.

2. A method of attaching a rack bush in a rack and pinion type power steering apparatus as claimed in claim 1, wherein the rack bush at the intermediate support position of the rack shaft fits an outer periphery of the rack bush corresponding to an approximately cylinder body to an inner peripheral portion of the intermediate housing surrounding the outer periphery of the rack shaft, and brings an end portion in an axial direction of the rack bush into contact with a locking portion of the intermediate housing so as to fix.

3. A structure of a rack bush wherein the rack bush slidably supporting the rack shaft in the rack and pinion type power steering apparatus with respect to the support body in the axial direction of the shaft is formed as an approximately cylinder body made of a bushing material, the rack bush is cut to a predetermined portion along an axial direction of the cylinder body alternately from both end portions in the axial direction of the cylinder body and is provided with a plurality of grooves at a uniform interval in a circumferential direction of the cylinder body, and a center portion in the axial direction in an inner peripheral portion of the cylinder body is formed as a bulge portion curved toward the axial direction, the bulge portion having an interior side and an exterior side, the bulge portion being unsupported on its exterior side.

4. A structure of a rack bush wherein the rack bush slidably supporting the rack shaft in the rack and pinion type power steering apparatus with respect to the support body in the axial direction of the shaft is formed as an approximately cylinder body made of a bushing material, the rack bush is cut along an axial direction of the cylinder body except both end portions in the axial direction of the cylinder body and is provided with a plurality of grooves at a uniform interval in a circumferential direction of the cylinder body, and a center portion in the axial direction of the structure body of the cylinder body extending in the axial direction between the grooves pinched by the grooves is formed as a bulge portion curved toward the axial direction.

5. A method of attaching a rack bush in a rack and pinion type power steering apparatus as claimed in claim 2, wherein the intermediate housing is constituted by a tube housing having a large diameter, and a tube housing having a small diameter and connected to the large-diameter tube housing via an annular step portion, and wherein the tubular step portion structures the lock portion.

6. A method of attaching a rack bush in a rack and pinion type power steering apparatus as claimed in claim 5, wherein one end in an axial direction of the rack bush is brought into contact with the annular step portion in the intermediate housing, and the other end in the axial direction of the rack bush is pressure inserted and fitted to an inner peripheral portion of the intermediate housing so as to be fixed by a stopper ring.

7. A structure of a rack bush as claimed in claim 3, wherein the grooves in the rack bush are cut three by three totally six from respective end portions of the rack bush constituted by the cylinder body.

8. A structure of a rack bush as claimed in claim 7, wherein the plurality of grooves have a uniform groove width and are cut to approximately three fourth of an entire length in an axial direction of the cylinder body constituting the rack bush.

9. A structure of a rack bush as claimed in claim 4, wherein the intermediate housing is constituted by a tube housing having a large diameter, and a tube housing having a small diameter and connected to the large-diameter tube housing via an annular step portion, and wherein one end of the rack bush is brought into contact with the annular step portion in the intermediate housing, and the other end in the axial direction of the rack bush is brought into contact with an annular step portion in an inner peripheral portion of a tubular housing corresponding to an extension portion of the other housing.

10. A structure of a rack bush as claimed in claim 4, wherein the plurality of grooves are constituted by twelve grooves having a comparatively small width.

* * * * *